(12) United States Patent
Breal et al.

(10) Patent No.: US 12,128,952 B2
(45) Date of Patent: Oct. 29, 2024

(54) DEVICE FOR ATTACHING, TO A MOTOR VEHICLE CHASSIS, THE REAR END OF THE SIDE RAILS OF AN ENGINE CRADLE RECEIVING AN ELECTRIC DRIVE VEHICLE PROPULSION SYSTEM

(71) Applicant: PSA AUTOMOBILES SA, Poissy (FR)

(72) Inventors: Ronan Breal, Bethoncourt (FR); Cedric Robert, Hericourt (FR)

(73) Assignee: PSA AUTOMOBILES SA, Poissy (FR)

( * ) Notice: Subject to any disclaimer, the term of this patent is extended or adjusted under 35 U.S.C. 154(b) by 251 days.

(21) Appl. No.: 17/777,876

(22) PCT Filed: Nov. 6, 2020

(86) PCT No.: PCT/FR2020/052030
§ 371 (c)(1),
(2) Date: May 18, 2022

(87) PCT Pub. No.: WO2021/116547
PCT Pub. Date: Jun. 17, 2021

(65) Prior Publication Data
US 2023/0026082 A1    Jan. 26, 2023

(30) Foreign Application Priority Data

Dec. 9, 2019   (FR) ..................... 1913962

(51) Int. Cl.
*B62D 21/15*   (2006.01)
*B62D 25/08*   (2006.01)

(52) U.S. Cl.
CPC ......... *B62D 21/155* (2013.01); *B62D 25/082* (2013.01)

(58) Field of Classification Search
CPC .... B62D 21/155; B62D 25/082; B62D 25/08; B62D 25/20; B62D 27/02; B62D 65/02
See application file for complete search history.

(56) References Cited

U.S. PATENT DOCUMENTS 6,843,524 B2 * 1/2005 Kitagawa ............. B62D 21/155
                                                           180/312
8,585,133 B2 * 11/2013 Yasuhara ........... B62D 25/2018
                                                          296/203.03

(Continued)

FOREIGN PATENT DOCUMENTS

EP   1277648 A1   1/2003
EP   1306289 A1   5/2003

(Continued)

OTHER PUBLICATIONS

Computer generated English translation of FR 3094331 (Year: 2024).*

(Continued)

*Primary Examiner* — James A Shriver, II
*Assistant Examiner* — Tiffany L Webb
(74) *Attorney, Agent, or Firm* — Sandberg Phoenix & von Gontard P.C.

(57) ABSTRACT

Disclosed is a device for attaching, to a motor vehicle chassis, the rear end of the side rails of an engine cradle receiving an electric drive propulsion system for the vehicle. According to the device of the invention and for each of the side rails (3a, 3b), the attachment device comprises a junction interface (5a, 5b) that includes at least a first junction member (7a, 7b). The first junction member (7a, 7b) is, on one hand, attached longitudinally (L1) to the rear end (4) of the side rail (3a, 3b) via a front end (8a) of the first junction member (7a, 7b) and, on the other hand, attached transversely (T1) to a lateral side member (1a, 1b) consti- (Continued)

tuting the chassis (1) via a rear end (8*b*) of the first junction member (7*a*).

8 Claims, 6 Drawing Sheets

(56) References Cited

U.S. PATENT DOCUMENTS

| | | | | |
|---|---|---|---|---|
| 8,668,248 | B2 * | 3/2014 | Ishizono | B62D 25/025 |
| | | | | 296/70 |
| 10,023,038 | B2 * | 7/2018 | Rawlinson | B60L 50/66 |
| 10,780,767 | B2 * | 9/2020 | Rawlinson | B62D 25/2036 |

FOREIGN PATENT DOCUMENTS

| | | | | |
|---|---|---|---|---|
| EP | 1314632 | A2 | 5/2003 | |
| EP | 2497699 | A1 | 9/2012 | |
| EP | 2468609 | B1 | 4/2017 | |
| FR | 3094331 | A1 * | 10/2020 | B62D 25/2027 |
| JP | 2005231477 | A | 9/2005 | |
| JP | 2009018724 | A | 1/2009 | |

OTHER PUBLICATIONS

International Search Report for PCT/FR2020/052030 mailed Feb. 19, 2021.
Written Opinion for PCT/FR2020/052030 mailed Feb. 19, 2021.

\* cited by examiner

DEVICE FOR ATTACHING, TO A MOTOR VEHICLE CHASSIS, THE REAR END OF THE SIDE RAILS OF AN ENGINE CRADLE RECEIVING AN ELECTRIC DRIVE VEHICLE PROPULSION SYSTEM

CROSS-REFERENCE TO RELATED APPLICATIONS

This application is the US National Stage under 35 USC § 371 of International Application No. PCT/FR2020/052030, filed Nov. 6, 2020 which claims the priority of French application 1913962 filed on Dec. 9, 2019, the content (text, drawings and claims) of both applications being incorporated here by reference.

BACKGROUND

The invention relates to the field of the chassis of a motor vehicle, in the context of a motor vehicle whose propulsion energy is wholly or partly electric, being supplied from an electrical energy reserve fitted to the vehicle. Within the framework of constraints linked to such a context, the invention relates more particularly to methods of protecting the chassis against deformation in the event of a frontal impact sustained by the vehicle.

The relative notions are now specified that are commonly used to define a motor vehicle, as well as its components and/or the relative positions of the components of the vehicle with respect to each other. Subsequently, such relative notions are used to describe the context of the invention and to address the problems arising therefrom, as well as to describe the invention.

To this end and unless otherwise specified, reference is made to an orthonormal coordinate system conventionally identifying the directions of extension of the vehicle, including a longitudinal direction extending between the front and the rear of the vehicle, a transverse direction extending between the right and left lateral sides of the vehicle identified with respect to the driver in the driving station of the vehicle, and a vertical direction identifying the extension of the vehicle in elevation from bottom to top from its rolling plane on the ground. As a result, a side member extends mainly longitudinally. Notions such as bottom and top, or other related relative notions such as upper and lower or such as below or under and above, or even such as overhang and bottom side, are defined according to the vertical extension of the vehicle in elevation with respect to its rolling plane on the ground.

Motor vehicles comprise a chassis constituting a reinforcement for stiffening the vehicle. The chassis houses, among other things, a base of the vehicle that is configured in a framework commonly composed of side members braced by crosspieces. A platform is commonly installed on the framework, in vertical interposition between the base and the passenger compartment of the vehicle.

Conventionally, the side members comprise at least right and left side members, and at least one side member that is interposed under the platform transversely between the lateral side members. It is common for the chassis to comprise several so-called median side members, at least one of which is potentially arranged in a tunnel. The crosspieces comprise at least one front face crosspiece disposed at the front of the vehicle and a front crosspiece interfaced between an engine compartment and the passenger compartment of the vehicle. It is usual for several medial crosspieces to be distributed longitudinally between the front crosspiece and a rear crosspiece of the chassis. The front face crosspiece and the front crosspiece delimit therebetween the engine compartment receiving the engine of the vehicle, a vertically and transversely extending fire wall separating the engine compartment from the passenger compartment of the vehicle.

Furthermore, an evolution of the drive system of motor vehicles has prompted designers to develop vehicles whose propulsion energy is at least partly electrically powered. The drive system of the vehicle is housed inside the engine compartment, and is commonly installed on an engine cradle. The engine cradle is attached on the one hand at its front end to the front face crosspiece and on the other hand to the front crosspiece via the rear end of longitudinal extension side rails.

To supply the electric power for propulsion of the vehicle, the vehicle is equipped with an electrical energy reserve commonly made up of battery modules that can advantageously be installed under the platform extending under the passenger compartment of the vehicle.

The energy storage capacity of the electrical energy reserve can thus be optimized, which ultimately allows increased autonomy of the vehicle in terms of electrical propulsion energy.

However, the search for an optimized energy storage capacity of the electrical energy reserve leads to an increase in overall volume of the electrical energy reserve. It is therefore appropriate for the electrical energy reserve to extend as far as possible under the platform along its longitudinal and transverse extension plane.

This then poses the difficulty of installing an electrical energy reserve having a substantial volume under the platform. This is why it is preferred to free the space available under the platform from any clutter, to thereby allow and/or facilitate the installation under the platform of an electrical energy reserve having a substantial volume. To this end, the presence of side members and/or crosspieces extending under the platform is desirable, as emerges for example from document EP2468609-B1 (TESLA MOTORS Inc).

According to document EP2468609-B1, the chassis is free of median side members and median crosspieces under the platform. The space available under the platform is thus optimized for the installation of a modular electrical energy reserve, which may have a substantial volume. The electrical energy reserve is mounted inside a frame by means of which the energy reserve is installed under the platform. The frame incorporates transverse stiffening elements that are longitudinally distributed inside the frame and between which modules making up the electrical energy reserve are installed. The transversely stiffened frame then bears against the side members of the chassis to compensate for the removal of said median side members and said median crosspieces, which usually extend under the platform.

However, the chassis is then weakened along its longitudinal extension. It is therefore observed that such a longitudinal embrittlement of the chassis affects its resistance in the event of a frontal impact sustained by the vehicle, to the detriment of satisfactory protection of the passengers of the vehicle. This shows that it is then useful to seek a solution to strengthen the chassis with respect to a frontal impact sustained by the vehicle, due to the absence of said median side members extending under the platform to optimize the volume of the electrical energy reserve.

SUMMARY

In this context, a device is disclosed for attaching, to a motor vehicle chassis, the rear end of right and left side rails comprising an engine cradle mounted on the chassis. Additionally a motor vehicle chassis is disclosed which is equipped with said engine cradle, wherein the rear ends of said side rails that the cradle comprises are attached to the chassis via an attachment device according. Further a motor vehicle is disclosed which comprises the chassis, the drive system of the motor vehicle being at least partly electrically powered. It is understood here that the vehicle is likely to be a vehicle commonly described as electric, the propulsive energy of which is exclusively electric, or to be a vehicle commonly described as hybrid, the propulsive energy of which is provided by an electric drive system and/or by a combustion engine.

A solution is provided concerning the methods of attaching the rear end of the side rails to the chassis that is capable of containing a deformation of the chassis in the event of a frontal impact sustained by the vehicle, which is sufficiently effective to protect the passenger(s) of the vehicle.

An object is to propose such a solution that compensates for a partial or total absence of elements for stiffening the chassis, in particular longitudinally, under a platform of a base of the chassis. As previously referenced, such an absence of stiffening elements is desired in order to optimize the space available under the platform that can receive an electrical energy reserve supplying at least electrical energy for propelling the vehicle.

Another object is to propose such a solution by limiting the increase in the mass of the vehicle induced by the methods of attaching the rear end of the side rails on the chassis, in order to best preserve the resources and therefore the autonomy of the vehicle in terms of propulsive energy.

Another object is to propose such a solution that can be implemented under the constraint of an arrangement of a pre-existing chassis structure. The aim is in particular to best limit the impact of such an arrangement on the manufacturing process of said pre-existing chassis structure, so as to allow the use of the same assembly line to manufacture said pre-existing chassis structure selectively with or without its development necessary for the implementation of the solution. Such an aim fits in particular under the constraint of seeking to reduce the costs related to the solution sought in the context of severe economic competition in the automotive field, which can make a potential solution prohibitive because of the costs involved.

For each of the side rails, the attachment device comprises a junction interface comprising at least a first junction member attached on the one hand longitudinally to the rear end of the side rail via a front end comprised by the first junction member, and on the other hand transversely to a lateral side member comprising the chassis via a rear end comprised by the first junction member. It is understood that the attachment device comprises two right and left junction interfaces that are respectively assigned to the rear ends of the side rails commonly comprising a right side rail and a left side rail.

Each of the first junction members is more particularly formed by a one-piece body, potentially composed of several elements secured together.

The transverse extension and the longitudinal extension of said one-piece body are more specifically limited between the rear end of the side rail and a docking zone of said one-piece body against the lateral side member. The first junction member is for example formed by a sheet metal shaped by stamping and/or other shaping, which extends between the front end and the rear end of the junction member. Preferably as referenced below, said sheet metal is reinforced by one or more reinforcements assembled together, then forming a first reinforcing member secured to the sheet metal by participating in said one-piece body constituting the first junction member.

The side rails are transversely arranged between the right and left lateral sides of the chassis, transversely offset with respect to the side members of the chassis.

Each of the two junction interfaces conforms to the arrangements provided by the attachment device, without excluding the possibility of being different from each other depending on the specific application of the attachment device.

In the event of frontal impacts sustained by the chassis, a longitudinal thrust force generated by the impact is transmitted via the first junction member from the side rails to the lateral side members that are respectively assigned to them. This reinforces the resistance of the chassis against its deformation in the event of a frontal impact, by transmission of the longitudinal thrust force sustained by the engine cradle to the lateral side members, via the side rails that are connected to the lateral side members by the first junction members assigned to them.

It is thus possible to avoid the installation of longitudinal reinforcing members under a platform of the base of the chassis, which extends in particular under the passenger compartment of the vehicle at the rear of the engine compartment that houses the engine cradle and that is provided at the front of the chassis. This finally allows optimization of the space available under the platform for receiving an electrical energy reserve at least propelling the vehicle.

The first junction member extends in particular on a bottom side of the side rail and has a median part interposed between the front end and the rear end of the first junction member. Said median part provides a transverse offset between the front end and the rear end of the first junction member.

The notion of "bottom side" is understood as an extension of the first junction member at a lower level of the side rail assigned to it, without meaning an extension under the side rail. Indeed, the first junction member extends on a bottom side of the side rail from its front end attached to the rear end of the side rail toward its rear end attached to the lateral side member.

The first junction member is potentially more or less vertically inclined from its front end to its rear end. The expression "more or less" is understood to mean that said inclination is in particular dependent on the vertical difference between the rear end of the side rail and the lateral side member to which the first junction member is attached, depending on the application of the attachment device.

More particularly, the front end and the rear end of the first junction member each have a longitudinal extension and are connected to each other by said median part. Said median part extends longitudinally and transversely, comprising a double inflection leaving said transverse offset between the rear end and the front end of the first junction member.

The arrangement of the median part of the first junction member interconnects the front end and the rear end of the first junction member, so that said transverse offset is formed between them. The transverse offset between the front end and the rear end of the first junction member produced via its median part allows compensation for said transverse gap between the side rail and the lateral side member to which the first junction member is attached, while allowing a transmission of said longitudinal thrust force from the side rail to the lateral side member.

Preferably, the first junction member houses at least one first reinforcing member connecting the front end and the rear end of the first junction member together. The first reinforcing member is transversely extended by being arcuate along a transverse-longitudinal plane between the front end and the rear end of the first junction member.

The first reinforcing member strengthens the intrinsic robustness of the first junction member against its deformation in the event of a frontal impact sustained by the chassis. The first reinforcing member also promotes the transfer, from the front end to the rear end of the first junction member, of the longitudinal thrust force generated in the event of a frontal impact sustained by the chassis.

According to one embodiment of the first junction member promoting its effectiveness, the first reinforcing member comprises:
 a first vertical extension section attached to the first junction member extending between the front end and the rear end of the first junction member,
 a vertical extension reinforcing wing and folded upper edge that is derived from the material of the first junction member. Said reinforcing wing extends at a transverse distance from said first section and along the edge of the first junction member, at its edge that is transversely oriented on the inside of the chassis. As commonly defined in the automotive field, the relative notions of interior orientation and exterior orientation with respect to the chassis are in particular applied to the relative position between two objects, such as in particular in the case in point between said first section and said reinforcing wing.
 a second section extending longitudinally at least partially inside the volume delimited between said first section and said reinforcing wing, the second section being attached with transversely antagonistic bearing against said first section and said reinforcing wing.

Preferably, the first junction member comprises a first shell that comprises a bottom enhanced with edge walls of vertical extension, the bottom of the first shell being delimited between a first edge wall and a second edge wall. More precisely, the bottom of the first shell is delimited between the edge walls, so that an interior volume of the shell provides a space for receiving at least the first reinforcing member. The first shell preferably forms a one-piece body by assembling the components of the first reinforcing member to each other and to the first shell. According to one embodiment, an edge of the bottom of the first shell is delimited between the first edge wall and a second so-called edge wall. Said edge of the bottom of the first shell, in particular of longitudinal extension, is transversely pressed against the lateral side member, and is longitudinally bordered by a wing for attaching the first junction member vertically under the lateral side member.

According to one embodiment, a first lug for attaching the first junction member to the rear end of the side rail is provided at the front end of the first junction member between the first edge wall and the second edge wall. The second edge wall is provided with a second lug for attaching the first junction member at its rear end, transversely against a lateral face of the lateral side member.

More specifically, the reinforcing wing is comprised of said second edge wall comprised by the first shell. Said first section comprising the first reinforcing member is docked at its rear end against said reinforcing wing, in front of the second attachment lug.

According to one embodiment, the junction interfaces respectively assigned to the side rails each further comprise a second junction member that is transversely interfaced between the first junction member and a transversely median shoe fitted to the chassis. The respective second junction members of the junction interfaces are transversely docked respectively on either side of the shoe.

In this case, the second junction members form damping members of a transverse thrust force, among other potential functionalities. Such a transverse thrust force may result from a possible transverse thrust component of the thrust force that is applied to the front of the chassis in the event of a frontal impact that it sustains, in particular in the event of a frontal-lateral impact applied at the front of the vehicle. Preferably and for each of the junction interfaces, the first junction member and the second junction member are transversely abutted against each other, jointly forming a one-piece body. The one-piece body formed by the first junction member and the second junction member is preferably produced by their assembly together. For example, the first junction member and the second junction member are joined transversely and attached to each other via interlocking combs that they respectively comprise.

More particularly according to one embodiment, the second junction member is arranged in a second shell of longitudinal and transverse extension, which preferably houses at least one second reinforcing member. Said reinforcement wing advantageously houses a partition wall between the interior volume of the first shell and the interior volume of the second shell, the reinforcing wing contributing to the stiffening of the second shell.

A motor vehicle comprises a chassis on which the respective rear ends of right and left side rails are attached that are comprised by an engine cradle mounted on the chassis. The vehicle is recognizable in that the rear ends of the side rails are attached to the chassis via an attachment device according.

DESCRIPTION OF THE FIGURES

The invention will be better understood upon reading the following detailed description of an embodiment of the present invention, in relation to the accompanying sets of figures:

FIG. 1 more particularly shows a device for attaching to the chassis the rear ends of side rails, respectively right and left, to the chassis, comprising an engine cradle mounted on the chassis, via right and left junction interfaces.

In FIG. 2, the right and left junction interfaces comprised by the attachment device shown in FIG. 1 are respectively attached to the rear ends of the right and left side rails.

In FIG. 3, the left junction interface is interfaced between the rear end of a left side rail shown in FIGS. 1 and 2 and a left lateral side member comprised by the chassis.

In FIG. 6, the junction interface is shown truncated transversely at its rear end, to more precisely illustrate the reinforcing members with which it is provided.

DETAILED DESCRIPTION

The figures and the non-limiting detailed descriptions thereof disclose the invention according to particular modalities which are not restrictive with regard to the scope of the invention. The figures and their detailed descriptions of one embodiment of the invention can serve to better define it, if necessary in relation to the general description which has just been given. Furthermore, to avoid overloading the figures and to facilitate the reading thereof, the reference numbers assigned to the terms and/or concepts used to describe the invention and indicated in any of the figures may potentially be included in the description of any other figure without implying their presence in all the figures.

In the figures, reference is made to an orthonormal coordinate system commonly used in the automotive field to define a vehicle, its components and/or the relative positions of the components of the vehicle with respect to each other.

According to this orthonormal coordinate system, the vehicle extends longitudinally L1 between the front AV1 and the rear AR1, transversely T1 between its right D1 and left G1 lateral sides, and vertically V1 in elevation relative to the rolling plane of the vehicle, from the bottom B1 to the top H1 of the vehicle.

Figure 1:
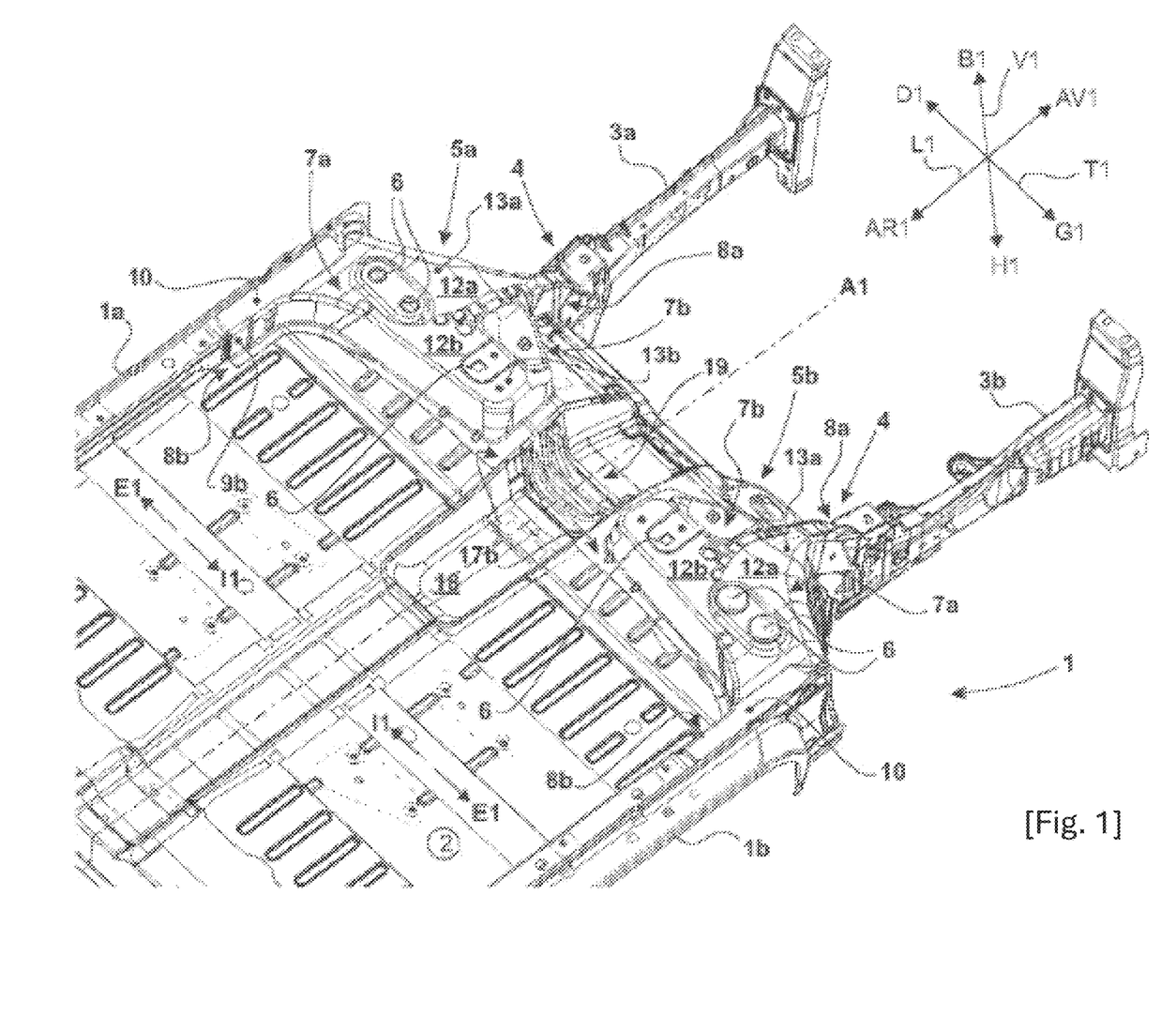
FIG. 1 is a partial perspective illustration seen from below of a chassis base of a motor vehicle.

In FIG. 1, the underbody of a chassis 1 of a motor vehicle is shown seen from below. The chassis underbody comprises right and left lateral side members 1a, 1b, respectively, between which a platform 2 extends. A cleared space is provided under the platform 2 for the installation of an electrical energy reserve in particular supplying the electrical energy for propelling the vehicle. The propulsion drive system of the vehicle is installed inside a front engine compartment of the vehicle, supported by an engine cradle attached to the chassis 1 at the front end and the rear end thereof.

Figure 2:
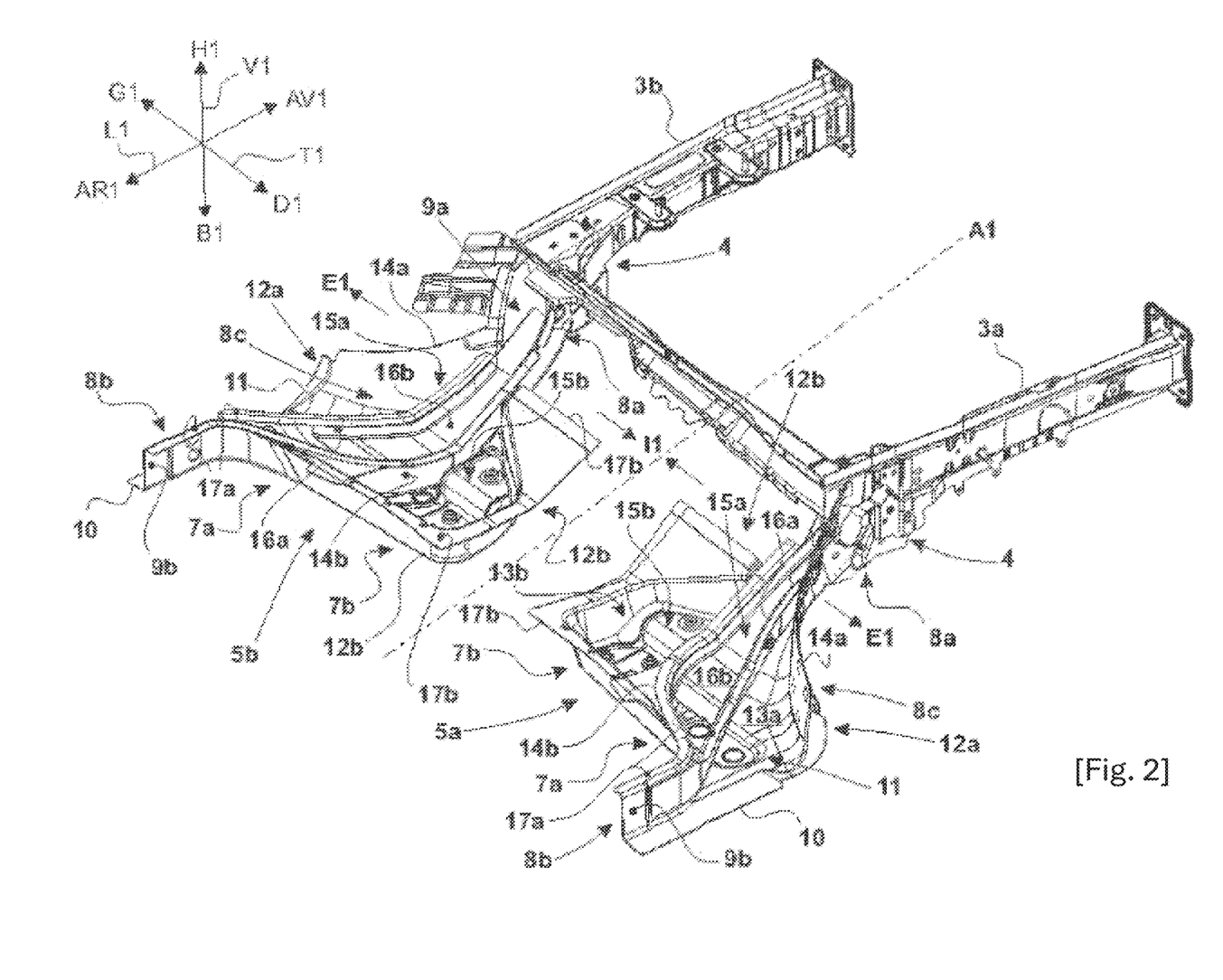
FIG. 2 is a perspective illustration seen from above of the side rails shown in FIG. 1.
Figure 3:
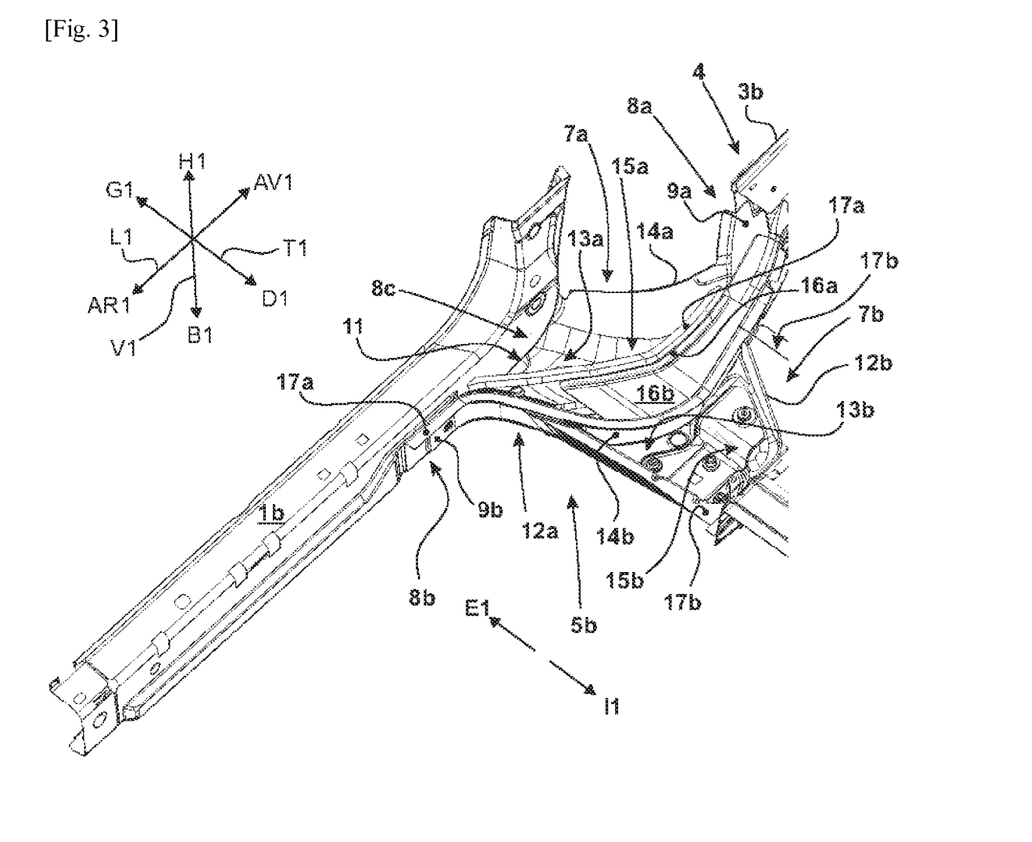
FIG. 3 is a partial top view perspective illustration of a left junction interface shown in FIGS. 1 and 2.

Referring also to FIG. 2, the engine cradle comprises a right side rail 3a and a left side rail 3b that are attached to the chassis 1 via their rear ends 4. A device is provided for attaching the rear end 4 of the side rails 3a, 3b to the chassis 1, via junction interfaces 5a, 5b. More specifically, a left junction interface 5b provides attachment of the rear end 4 of the left side rail 3b to a left side member 1b of the chassis 1, as shown in FIG. 3, and a right junction interface 5a similarly provides attachment of the rear end 4 of the right side rail 3a to a right side member 1a of the chassis 1.

According to the illustrated example, the left junction interface 5b and the right junction interface 5a are identical by being installed symmetrically on the chassis 1 with respect to a transversely median longitudinal axis A1 of extension of the chassis 1. The arrangement of the attachment interfaces 5a, 5b does not preclude shaping thereof to receive fittings, such as for example markers 6 for their control, which are used during the assembly of the components of the chassis 1 on a pre-existing vehicle production line. A chassis 1 can thus be handled on an assembly line of differentiated vehicles that nevertheless have identical rolling bases.

As is more visible in FIGS. 1 to 7, each of the junction interfaces 5a, 5b comprises a first junction member 7a and a second junction member 7b that are transversely abutted and attached to each other.

More particularly visible in FIG. 2, the right 5a and left 5b junction interfaces, and therefore the first junction members 7a and the second junction members 7b that they comprise, respectively, extend along the bottom side of the side rails 3a, 3b. The junction interfaces 5a, 5b extend in particular at the rear of a separating fire wall between the engine compartment and the passenger compartment of the vehicle, from the rear end 4 of the side rails 3a, 3b toward the lateral side members 1a, 1b that are respectively assigned to the junction interfaces 5a, 5b.

The junction interfaces 5a, 5b are more or less inclined with respect to the rolling plane of the vehicle according to the configuration of the chassis 1, in particular according to the longitudinal and/or transverse separation gap between the rear ends 4 of the side rails 3a, 3b and the zone for attaching the junction interfaces 5a, 5b to the lateral side members 1a, 1b that are assigned to them, respectively.

In FIGS. 2 and 3, and for each of the junction interfaces 5a, 5b, the junction interface 5a, 5b connects the rear end 4 of the side rail 3a, 3b to the lateral side member 1a, 1b via the first junction member 7a. A front end 8a of longitudinal extension of the first junction member 7a is attached longitudinally to the rear end 4 of the side rail 3a, 3b, via a first attachment lug 9a which comprises the first junction member 7a. A rear end 8b of longitudinal extension of the first junction member 7a is attached transversely to the lateral side member 1a, 1b via a second attachment lug 9b comprised by the first junction member 7a.

Figure 4:
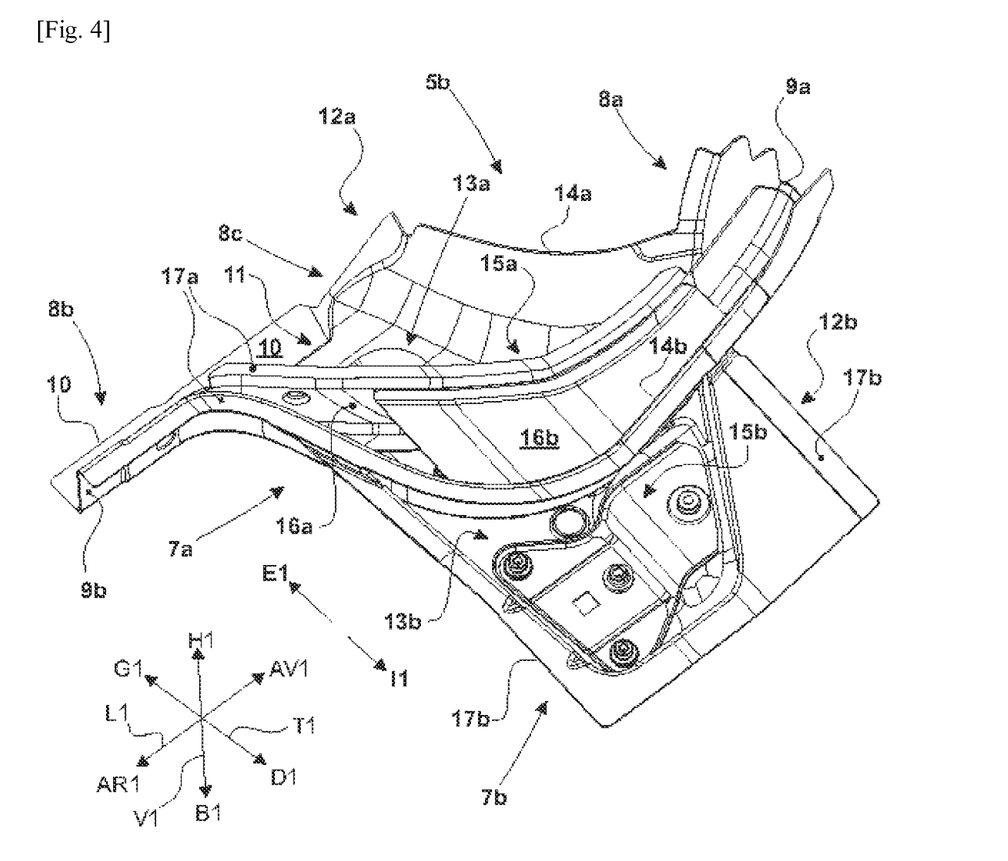
FIG. 4 is a perspective illustration seen from above of the left junction interface shown in FIGS. 1 to 3, composed of a first junction member and a second junction member that are transversely abutted and attached to each other.
Figure 5:
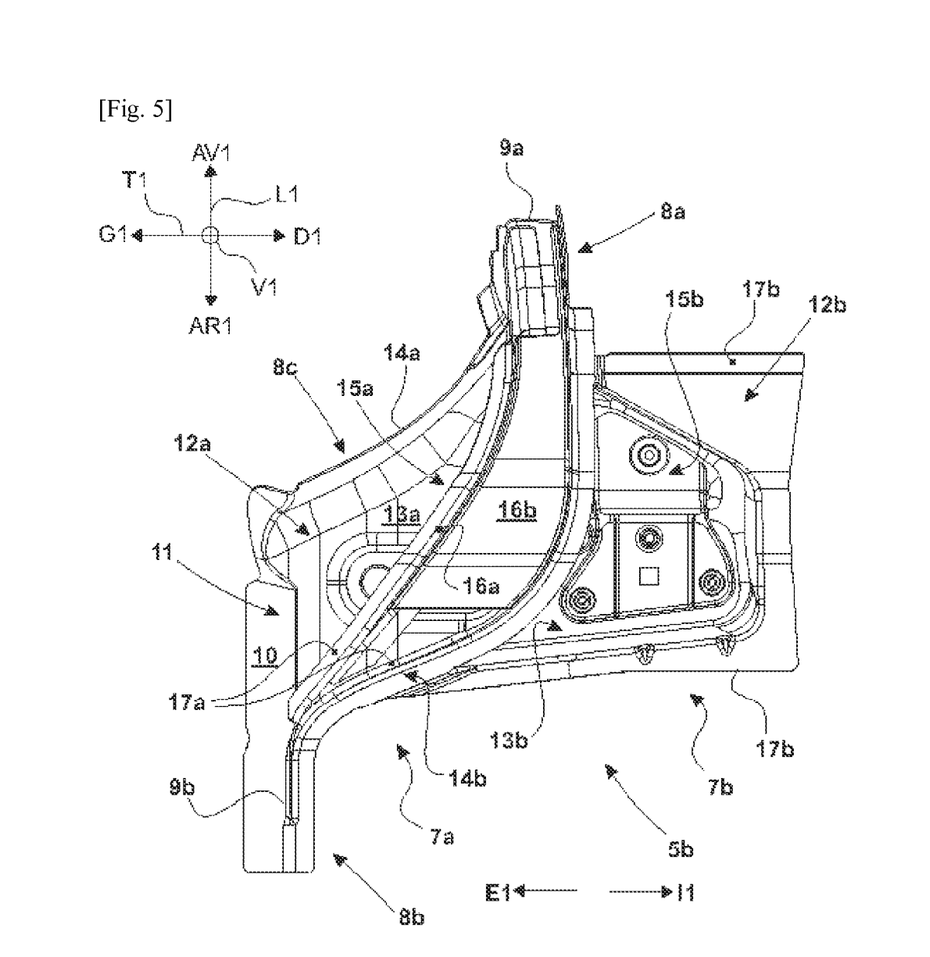
FIG. 5 is a top view illustration of the left junction interface shown in FIGS. 1 to 4.
Figure 7:
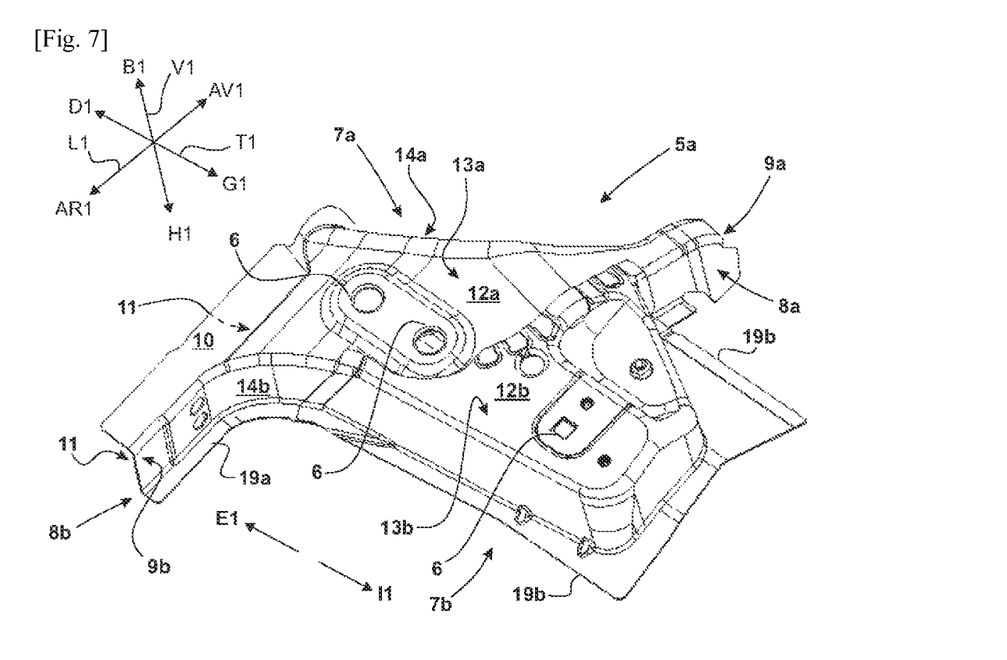
FIG. 7 is a bottom view perspective illustration of the right junction interface shown in FIGS. 1 to 3. Because the junction interfaces are identical due to being installed symmetrically on the chassis, the bottom illustration of the right junction interface is consistent with the top illustration of the left junction interface.

More particularly visible in FIGS. 4, 5 and 7, the first junction member 7a is also attached vertically under the lateral side member 1a, 1b via an attachment wing 10 which comprises the first junction member 7a. Said attachment wing 10 has a transverse extension and extends longitudinally along a docking edge 11 of the first junction member 7a that is transversely pressed against the lateral side member 1a, 1b as shown in FIGS. 1 and 3.

More particularly visible in FIGS. 4 to 7, the first junction member 7a has a median part 8c that is interposed between the front end 8a and the rear end 8b of the first junction member 7a. Said median part 8c has a double inflection formed between the front end 8a and the rear end 8b of the first junction member 7a, which provides a transverse offset between the front end 8a and the rear end 8b of the first junction member 7a. Such a transverse offset provides the transverse connection, via the first junction member 7a, between the rear end 4 of the side rails 3a, 3b and the lateral side member 1a, 1b.

The first junction member 7a comprises a first shell 12a that extends longitudinally and transversely. The first shell 12a provides a bottom 13a enhanced with edge walls 14a, 14b that extend vertically from the bottom 13a of the first shell 12a toward the top of the chassis 1, including a first edge wall 14a and a second edge wall 14b.

Said docking edge 11 is formed by the bottom 13a of the first shell 12a, extending between the outer transverse ends E1 of the first edge wall 14a and of the second edge wall 14b, which are oriented toward the lateral side member 1a, 1b. The first attachment lug 9a extends transversely and in elevation between the front ends of the first edge wall 14a and the second edge wall 14b. The second attachment lug 9b is formed by a longitudinal extension of the second edge wall 14b at its rear end.

The first junction member 7a incorporates a first reinforcing member 15a that is housed inside the first shell 12a for reinforcement thereof against deformation in the event of a frontal impact sustained by the chassis 1. The first reinforcing member 15a interconnects the front end 8a and the rear end 8b of the first junction member 7a, extending longitudinally and transversely. The first reinforcing member 15a partially occupies the interior volume of the first shell 12a by presenting an arcuate taper conformation along a transverse-longitudinal plane between the front end 8a and the rear end 8b of the first junction member 7a.

Figure 6:
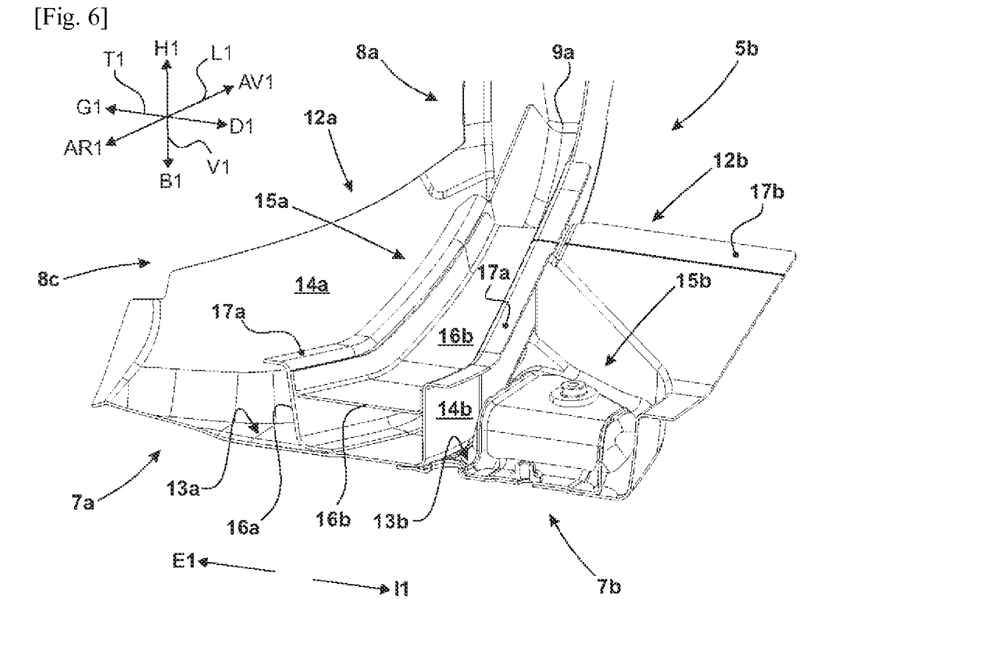
FIG. 6 is a top view perspective illustration of the left junction interface shown in FIGS. 1 to 5.

More particularly visible in FIG. 6, the first reinforcing member 15a comprises various components derived from the material of the first shell 12a and/or attached to the first shell 12a constituting the first junction member 7a. A first component is formed by a first section 16a, a second component is formed by a reinforcing wing 14b comprised of the first shell 12a and that is formed by said second edge wall 14b, and a third component is formed by a second section 16b extending transversely and longitudinally between the first section 16a and said reinforcing wing 14b.

The first section 16a has an S profile and extends vertically from the bottom 13a of the first shell 12a to which it is attached. The first section 16a is oriented transversely to the outer side E1 of the chassis 1, or in other words in the direction of the lateral side member 1a, 1b to which it is attached. The first section 16a extends longitudinally and transversely from the front end 8a of the first junction member 7a and is docked at its rear end against the reinforcing wing 14b, in front of the second attachment lug 9b.

The reinforcing wing 14b has a vertical extension and has a folded upper edge, being derived from the component material of the first shell 12a. The reinforcing wing 14b extends at a variable transverse distance from the first section 16a, bordering the first shell 12a on its side transversely oriented toward the second junction member 7b, or in other words on its side transversely oriented on the interior side 11 of the chassis 1 or in other words still on its side oriented transversely opposite the lateral side member 1a, 1b to which the junction interface 5a, 5b is attached. The reinforcing wing 14b and the first section 16a delimit therebetween the conformation of the first reinforcing member 15a in an arcuate taper.

The second section 16b is transversely interfaced between the first section 16a and the reinforcing wing 14b. The second section 16b has a U-shaped profile that is attached to the first section 16a and to the reinforcing wing 14b via the branches of the U-shaped profile of the second section 16b. The second section 16b extends longitudinally at least partially inside the volume delimited between the first section 16a and the reinforcing wing 14b, with transverse opposing bearing against the first section 16a and the reinforcing wing 14b.

The second junction member 7b is formed by a second shell 12b that is reinforced by a second reinforcing member 15b that it houses. The second shell 12b extends longitudinally and transversely in extension, on the interior side 11 of the chassis, of the first shell 12a. The second shell 12b comprises a bottom 13b enhanced with edge walls that extend vertically from the bottom 13b of the second shell 12b toward the top of the chassis 1.

The edge wall of the second shell 12b on its face facing the first junction member 7a is formed by the reinforcing wing 14b comprised by the first junction member 7a, or in other words is formed by the second edge wall 14b comprised by the first shell 12a.

The reinforcing wing 14b thus forms a partition wall between the interior volume of the first shell 12a and the interior volume of the second shell 12b. The reinforcing wing 14b also participates in reinforcing the second shell 12b in the event of a frontal impact sustained by the vehicle, in particular in the event of a frontal-lateral impact applied to the front of the vehicle. The second reinforcing member 15b housed inside the second shell 12b has a conformation in stages following the vertical extension of the second shell 12b, each of the stages being individually attached to the bottom 13b comprised by the second shell 12b.

The first junction member 7a and the second junction member 7b are each provided with a plate 17a, 17b for pressing down and/or attaching the junction members under the platform 2, as illustrated in FIG. 1. Said plates 17a, 17b are at least partly formed by returns comprised by at least one of the edge walls 14a, 14b of the first shell 12a and of the second shell 12b. The plate 17a of the first junction member 7a is formed at least by the flap of the upper edge of the reinforcing wing 14b and by a wing of the first section 16a formed by the S shape of its profile. The plate 17b of the second junction member 7b is provided at the upper periphery and at least partially around the edge walls of the second shell constituting the second junction member 7b.

In FIG. 1, the base of the vehicle is provided with a longitudinal reinforcing tunnel 18 that extends along said transversely median longitudinal axis A1 and that extends vertically projecting upward from the chassis 1. The tunnel 18 provides a shoe 19 to which the junction interfaces 5a, 5b are docked transversely via the second junction members 7b that they comprise, respectively on either side of the shoe 19 along its transverse extension.

The invention claimed is:

1. An attachment device for attaching, to a motor vehicle chassis, a rear end of right and left side rails of an engine cradle mounted on the chassis, wherein for each of the side rails, the attachment device comprises a junction interface comprising at least a first junction member attached on the one hand longitudinally to the rear end of the side rails via a front end comprising the first junction member, and on the other hand transversely to a lateral side member of the motor vehicle chassis via a rear end of the first junction member, wherein the first junction member houses at least a first reinforcing member interconnecting the front end and the rear end of the first junction member, said first reinforcing member being extended transversely by being arcuate along a transverse-longitudinal plane between the front end and the rear end of the first junction member, wherein the first reinforcing member comprises:

a first vertical extension section attached to the first junction member extending between the front end and the rear end of the first junction member, a reinforcing wing of vertical extension and with a folded upper edge that is derived from the material of the first junction member, said reinforcing wing extending at a transverse distance from said first section and on the edge of the first junction member at its edge that is transversely oriented on the inside of the chassis, a second section extending longitudinally at least partially inside a volume delimited between said first section and said reinforcing wing, the second section being transversely supported against said first section and said reinforcing wing.

2. The attachment device according to claim 1, wherein the first junction member extends below the side rails and has a median part interposed between the front end and the rear end of the first junction member, said median part forming a transverse offset between the front end and the rear end of the first junction member.

3. The attachment device according to claim 1, wherein the first junction member comprises a first shell that comprises a bottom reinforced by vertically extending edge walls, the bottom of the first shell being delimited between a first edge wall and a second edge wall, in that an edge of the bottom of the first shell is delimited between the first edge wall and the second edge wall, is transversely pressed against the lateral side member and is longitudinally bordered by an attachment wing of the first junction member vertically under the lateral side member, in that a first lug for attaching the first junction member to the rear end of the side rail is provided at the front end of the first junction member between the first edge wall and the second edge wall, and in that the second edge wall is provided with a second attachment lug for attaching the rear end of the first junction member transversely against a lateral face of the lateral side member.

4. The attachment device according to claim 3, wherein:

in that the reinforcing wing comprises said second edge wall comprised by the first shell, and in that said first section comprising the first reinforcing member is docked at its rear end against said reinforcing wing, in front of the second attachment lug.

5. The attachment device according to claim 1, wherein the junction interfaces respectively assigned to the left and right side rails each further comprise a second junction member that is transversely interfaced between the first junction member and a transversely median shoe fitted to the chassis, the respective second junction members of the junction interfaces being transversely docked on either side of the shoe, respectively.

6. The attachment device according to claim 5, wherein for each of the junction interfaces, the first junction member and the second junction member are transversely abutted against each other, jointly forming a one-piece body.

7. The attachment device according to claim 5, wherein the second junction member is arranged in a second shell of longitudinal and transverse extension housing a second reinforcing member, said reinforcing wing forming a partition wall between the interior volume of the first shell and the interior volume of the second shell.

8. A motor vehicle comprising a chassis on which the respective rear ends of right and left side rails are attached that comprise an engine cradle mounted on the chassis, wherein the rear ends of the side rails are attached to the chassis via the attachment device according claim 1.

* * * * *